United States Patent [19]

Yamaoka et al.

[11] Patent Number: 4,973,516

[45] Date of Patent: Nov. 27, 1990

[54] GASKETS FOR USE IN INTERNAL COMBUSTION ENGINES

[75] Inventors: Hidenori Yamaoka, Odawara; Yoshinao Kobayashi, Tachikawa; Kuri Suga, Kawasaki, all of Japan

[73] Assignee: Nippon Carbon Co., Ltd., Tokyo, Japan

[21] Appl. No.: 330,084

[22] PCT Filed: Jul. 28, 1988

[86] PCT No.: PCT/JP88/00760

§ 371 Date: Mar. 9, 1989

§ 102(e) Date: Mar. 9, 1989

[87] PCT Pub. No.: WO89/01102

PCT Pub. Date: Feb. 9, 1989

[30] Foreign Application Priority Data

Jul. 29, 1987 [JP] Japan ............................ 62-187750

[51] Int. Cl.⁵ ............................ B32B 9/00; B32B 5/16
[52] U.S. Cl. .................................. 428/332; 428/323; 428/339; 428/408
[58] Field of Search ................ 428/323, 332, 339, 408

[56] References Cited

U.S. PATENT DOCUMENTS 4,792,491 12/1988 Atkinson et al. .................. 428/408

FOREIGN PATENT DOCUMENTS 53-44917 12/1978 Japan .
57-25383 5/1982 Japan .
60-32881 2/1985 Japan .
61-118548 6/1986 Japan .

*Primary Examiner*—William J. Van Balen
*Attorney, Agent, or Firm*—Bucknam and Archer

[57] ABSTRACT

A gasket for use in internal combustion engines characterized in that one or both surfaces of a metallic or non-metallic sheet thereof are coated with a coat layer of a thickness of from 10 to 300 $\mu$m composed of a coating material comprising from 20 to 60% by weight of expanded graphite having a specific volume of from 10 to 300 cc/g and from 40 to 80% by weight of a binder such as a synthetic resin.

7 Claims, No Drawings

GASKETS FOR USE IN INTERNAL COMBUSTION ENGINES

TECHNICAL FIELD

The present invention relates to a gasket for use in internal combustion engines. More particularly, it relates to such a gasket which has been improved in gasket properties to have high restitutivity after compression, a satisfactory friction coefficient and good stress relaxation rate, whereby it has been markedly improved in sealability. The improvements may be made by covering the starting gasket with a coat layer having a specified thickness and comprising expanded graphite and a binder such as a synthetic resin in specified proportions.

BACKGROUND ART

As gaskets for use in internal combustion engines, there have heretofore been known in the art steel type gaskets in which the metallic sheets are laminated with one another, gaskets comprising steel type gaskets coated with rubbers or synthetic resins, asbestos gaskets comprising asbestos, and flexible graphite sheets comprising expanded graphite in the form of sheet.

In metallic gaskets, such as steel type ones, originally having low percent recovery after compression, however, a work called "beat-standing" is carried out on the portions thereof for enhancing their sealability so that a recovery force necessary for sealing may be obtained on the worked portions. However, the beats tend to be fatigued during a prolonged period of service time, and thus, the metallic gaskets will raise a problem that their sealability are not relied upon. Further, since the metallic gaskets are constituted of metallic sheets, processes for the manufacture thereof are complicated and the gaskets so manufactured are expensive.

Coating materials consisting only of rubber or a synthetic resin serves only to make up for surface irregularities of a mating material to be coated therewith, and thus, coats made from said coating materials are not heat resistant enough to cope with high load and temperature of engines. When they are used in the preparation of gaskets, the resulting gaskets will not have satisfactory sealability.

Japanese Patent Publication Gazette No. 53-44917 discloses a flexible graphite sheet material having Teflon added thereto. The disclosed sheet will exhibit excellent properties when used in preparing a gasket. However, in order that the disclosed sheet is to be used in preparing a gasket it should naturally has a thickness of at least 0.3 mm, usually at least 0.4 mm. It is difficult to supply such thick graphite sheets at low costs.

Japanese Patent Publication Gazette No. 57-25383 discloses a carbon-metal composite material comprising a metallic sheet having a sheet of expanded graphite adhered to one or both surfaces thereof, the composite material being excellent in anti-corrosive and impermeable properties. But it is not a material for use as a gasket in internal combustion engines.

Japanese Utility Model Publication Gazette No. 62-24029 discloses a gasket for a cylinder head, comprising a lead plate as the coat layer. The disclosed gasket, however, does not have satisfactory sealability because of its low recovery force after compression.

Recently, there are proposed gaskets comprising aramid fibers and synthetic resins. While such gaskets have a satisfactory sealability, they pose problems in low heat resistance and high manufacturing costs.

The invention is to solve the above discussed problems associated with the prior art. Thus, an object of the invention is to provide a gasket for use in internal combustion engines in which the demerits of metallic gaskets are made up for by the merits of expanded graphite sheets and which has improved gasket properties such as high recovery from compression, a satisfactory friction coefficient and good stress relaxation rate, leading to an excellent sealability and which can be prepared at a lower cost by using a simple manufacturing step of coating or printing than the conventional gaskets where preformed sheets of expanded graphite are used.

DISCLOSURE OF INVENTION

The object of the invention may be achieved by providing a gasket for use in internal combustion engines which comprises a metallic or non-metallic sheet having formed on one or both surfaces thereof a coat layer of a thickness of from 10 to 300 $\mu$m composed of a coating material comprising from 20 to 60% by weight of expanded graphite having a specific volume of from 10 to 300 cc/g and from 40 to 80% by weight of a binder.

The coating material used herein comprises from 20 to 60% by weight of expanded graphite having a specific volume of from 10 to 300 cc/g and from 40 to 80% by weight of a binder such as a synthetic resin.

By the term "expanded graphite" used herein is meant a graphite having a lattice layer expanded in the direction of the C axis to an extent of at least 10 times the size of the original. Such expanded graphite may be prepared by the following process. Particulate graphite, including for example, naturally occurring graphites, pyrolyzed graphites and Kisch graphites, is first pretreated with a strong oxidizing agent such as concentrated sulfuric acid, concentrated nitric acid, a mixture of concentrated nitric acid and potassium chlorate, a mixture of concentrated sulfuric acid and potassium nitrate, or potassium permanganate, or with a halogen compound such as bromine or aluminum chloride to form interlayer compounds. The particulate graphite having the interlayer compounds formed therein is then abruptly heat treated at an elevated temperature, for example to a temperature of at least 1000° C. for a period of from 1 to 10 seconds to decompose the interlayer compounds to evolve gases, and by the pressure of the gases distances between the adjacent layers of the graphite lattice are expanded to provide particulate expanded graphite. Conditions of the pretreatment and heat treatment are selected so that expanded graphite having a specific volume of from 10 to 300 cc/g may be obtained (a rate of expansion of from 10 to 300 times).

The expanded graphite used herein should have a specific volume of from 10 to 300 cc/g. Expanded graphite having a specific volume of less than 10 cc/g is not suitable for use in the preparation of gaskets, since a satisfactory recovery is not achieved. A coating composition used herein comprises from 20 to 60% by weight, preferably from 30 to 50% by weight of the above specified expanded graphite. With less than 20% by weight of the expanded graphite a satisfactory recovery is not achieved, whereas with the expanded graphite in excess of 60% by weight dispersion of the expanded graphite in a binder frequently becomes non-uniform.

In addition to the above mentioned expanded graphite the coating material used herein comprises a curable binder such as synthetic resins and fluorine rubber.

Examples of synthetic resins which can be used herein include, for example, phenolic resins, epoxy resins, acrylic resins and fluorine resins such as polytetrafluoroethylene (Teflon supplied by E. I. Du pont company). The binder is incorporated into the coating material in an amount of from 40 to 80% by weight, preferably from 50 to 70% by weight for the same reasons as mentioned above.

The coating material is applied onto one or both surfaces of a metallic or non-metallic sheet which constitute a main material of the gasket. The metallic sheet may be made of iron, a stainless steel, copper, a copper alloy, aluminum or an aluminum alloy, while the non-metallic sheet may be composed of asbestos, ceramics, paper, aramid fibers, synthetic resin, graphite or rubber, or a composite material thereof.

The coating material is obtained by applying a precursor thereof onto one or both surfaces of the metallic or non-metallic sheet by coating, printing such as screen printing, dipping or spraying, followed by curing. It is not always necessary to coat whole surfaces of the base sheet with the coating material. Only those portions of the sheet where sealing will be required, for example, portions corresponding to clearances of bores and holes for oil of engines, may be locally coated with the coating material. The coat layer has a thickness of from 10 to 300 μm.

The gasket according to the invention so prepared has a high recovery from compression, good gasket properties including a satisfactory friction coefficient and good stress relaxation rate as well as good basic properties such as oil resistance, and in consequence, highly suitable for use in internal combustion engines.

EXAMPLES AND COMPARATIVE EXAMPLES

The invention will be further described in detail with reference to the following Examples and Comparative Examples.

Example 1

A coating composition comprising 35% by weight of expanded graphite having a specific volume of 200 cc/g and 65% by weight of Teflon ( a trade name of polytetrafluoroethylene supplied by Du pont company) was applied onto both surfaces of a metallic sheet having a thickness of 0.25 mm and made of stainless steel (SUS 304) by dipping and cured to form coat layers having a thickness of 50 μm on both surfaces of the stainless steel sheet.

The gasket so prepared was tested for appearance, adhesion property, percent compression recovery, oil resistance, stress relaxation rate and friction coefficient. Results are shown in Table 2.

Examples 2 to 6

Gaskets were prepared, following the procedure of Example 1 except that binders indicated in Table 2 were used and that coat layers having a thickness indicated in Table 1 were formed. The gaskets so prepared were tested as in Example 1. Results are shown in Table 2.

Comparative Examples 1 to 3

Gaskets were prepared by coating the metallic sheets of Example 1 on both surfaces thereof with coating materials indicated in Table 1. The gaskets so prepared were tested as in Example 1. Results are shown in Table 2.

TABLE 1

| Example No. | Binder (Coating material in Comp. Exs. 2 & 3) | Thickness of coat layer (on one side:μm) |
| --- | --- | --- |
| Example 1 | Teflon | 10 |
| Example 2 | Phenolic resin I | 50 |
| Example 3 | Phenolic resin II | 100 |
| Example 4 | Phenolic resin II | 200 |
| Example 5 | Silicone resin | 300 |
| Example 6 | Silicone resin | 500 |
| Comp. Ex. 1 | none | 0 |
| Comp. Ex. 2 | Asbestos | 50 |
| Comp. Ex. 3 | Lead plating | 50 |

TABLE 2

| Properties | Ex. 1 | Ex. 2 | Ex. 3 | Ex. 4 | Ex. 5 | Ex. 6 | Comp. Ex. 1 | Comp. Ex. 2 | Comp. Ex. 3 |
| --- | --- | --- | --- | --- | --- | --- | --- | --- | --- |
| Thickness of coat (μm) | 10 | 50 | 100 | 200 | 300 | 500 | 0 | 50 | 50 |
| (1) Appearance | B | B | B | C | B | B | — | — | — |
| (2) Adhesion | B | B | B | B | C | C | — | — | — |
| (3) Compression property % compression recovery | B | A | A | A | B | B | D | B | D |
| (4) Oil resistance | | | | | | | | | |
| % increase of thickness & weight | A | A | B | B | C | C | A | C | A |
| % compression recovery | C | A | B | B | C | C | D | C | D |
| (5) Stress relaxation rate | B | A | B | B | C | C | D | C | D |
| (6) Friction coefficient | A | A | A | A | A | A | B | C | B |

METHODS OF TESTING AND ESTIMATION (1) Appearance

Appearance of the gaskets (samples) so prepared was visually observed. Appearances which were good, slightly bulged and badly bulged were rated as B, C and D, respectively.

(2) Adhesion

A coat layer of each tested sample was incised with a knife, and peeled off from the base sheet. Samples having the coat layer bonded to the base sheet strongly, relatively strongly and weakly were rated as B, C, and D, respectively.

(3) % compression recovery

Percent compression recovery was tested in accordance with ASTM F 36, Method A.

(4) Oil resistance

After immersion in JIS No. 3 test oil, samples were determined for their % increase of thickness, % increase of weight and % compression recovery.

(5) Stress relaxation rate

Stress relaxation rate was tested in accordance with ASTM F 36, Method B, with the temperature of atmosphere set at 150° C.

(6) Friction coefficient

A maximum static friction coefficient was determined by measuring a pulling out force by means of an autograph. In the test the sample was clamped at a clamping force of 60 kg/cm$^2$ by a clamping chuck which had been abrasively finished with #1000 abrasive paper.

In the tests (3) to (6), samples which gave very good, fairly good, ordinary and bad results were rated as A, B, C and D, respectively.

Results of the Tests

It is revealed from the results shown in Table 2 that when gaskets of Examples 1 to 6 according to the invention are compared with those of Comparative Examples 1 to 3 according to the prior art, the gaskets according to the invention are apparently superior in percent compression recovery, stress relaxation rate and friction coefficient. Table 2 further reveals that the gaskets according to the invention are excellent in a basic property such as oil resistance which is required in gaskets for use in internal combustion engines.

Industrial Applicability

As described above the invention has provided a gasket for use in internal combustion engines having improved gasket properties including percent compression recovery, friction coefficient and stress relaxation rate leading to an excellent sealability.

We claim:

1. A gasket for use in internal combustion engines which comprises a metallic or non-metallic sheet having formed on one or both surfaces thereof a coat layer of a thickness of from 10 to 300 μm composed of a coating material comprising from 20 to 60% by weight of expanded graphite having a specific volume of from 10 to 300 cc/g and from 40 to 80% by weight of a binder.

2. The gasket for use in internal combustion engines in accordance with claim 1 wherein said binder is a synthetic resin.

3. The gasket for use in internal combustion engines in accordance with claim 2 wherein said synthetic resin is selected from phenolic resins, epoxy resins, acrylic resins, silicone resins and fluorine resins.

4. The gasket for use in internal combustion engines in accordance with claim 1 wherein said binder is a fluorine rubber.

5. The gasket for use in internal combustion engines in accordance with claim 1 wherein said metallic sheet is composed of iron, copper, a copper alloy, aluminum, an aluminum alloy or a stainless steel.

6. The gasket for use in internal combustion engines in accordance with claim 1 wherein said non-metallic sheet is composed of asbestos, ceramics, paper, aramid fibers, a synthetic resin, graphite or rubber, or a composite material thereof.

7. The gasket for use in internal combustion engines in accordance with claim 1 wherein said coat layer is formed by applying said coating material to said metallic or non-metallic sheet by coating, printing dipping or spraying, followed by curing the applied coating material.

* * * * *